United States Patent [19]
Yukawa

[11] 4,207,515
[45] Jun. 10, 1980

[54] BATTERY CHARGER

[75] Inventor: Hideki Yukawa, Susono, Japan

[73] Assignee: Kokusan Denki Co., Ltd., Numazu, Japan

[21] Appl. No.: 905,780

[22] Filed: May 8, 1978

[30] Foreign Application Priority Data

May 16, 1977 [JP] Japan ................................ 52/56174
Aug. 19, 1977 [JP] Japan ........................ 52/110101[U]

[51] Int. Cl.$^2$ ............................................. H02J 7/14
[52] U.S. Cl. ....................................... 320/59; 320/61; 322/28; 322/89
[58] Field of Search ............................. 322/28, 89–94; 320/40, 57, 59, 61, 71

[56] References Cited

U.S. PATENT DOCUMENTS

| | | | |
|---|---|---|---|
| 3,364,411 | 1/1968 | Wright | 320/61 |
| 3,663,947 | 5/1972 | Pfefeer | 322/93 X |
| 3,781,631 | 12/1973 | Nelson et al. | 320/25 |
| 3,857,082 | 12/1974 | Van Opijnen | 320/59 X |

FOREIGN PATENT DOCUMENTS 51-400476 2/1976 Japan .

OTHER PUBLICATIONS

Japanese Utility Model Appl. pub. No. 4004/76, Pub. Feb. 4, 1976, Kubo.

Primary Examiner—Robert J. Hickey
Attorney, Agent, or Firm—Pearne, Gordon, Sessions

[57] ABSTRACT

A battery charger including a hybrid bridge rectifier circuit adapted to rectify the output of an AC generator to charge a battery is characterized in that the rectifier circuit includes thyristors having the anodes connected to each other to form the negative output terminal of the rectifier circuit and diodes having the cathodes connected to each other to form the positive output terminal of the rectifier circuit. The anodes of the diodes are respectively connected to the cathodes of the thyristors, and the connecting junctions form the input terminals of the rectifier circuit. There is also provided a control circuit adapted to couple the gates of the thyristors to the positive input terminal of the rectifier circuit.

1 Claim, 9 Drawing Figures

BATTERY CHARGER

BACKGROUND OF THE INVENTION

The present invention relates to a battery charger including a hybrid bridge or a semicontrolled bridge rectifier circuit adapted to rectify the output of an AC generator to charge a battery.

A conventional battery charger of this type includes thyristors having the anodes respectively connected to the input terminals of the rectifier circuit and having the cathodes connected to each other to form the positive output terminal of the rectifier circuit and diodes having the cathodes respectively connected to the input terminals of the rectifier circuit and having the anodes connected to each other to form the negative output terminal of the rectifier circuit. There is provided a coupling device for coupling the gates of the thyristors to the input terminals of the rectifier circuit to provide gate signals, and a disabling device for disabling the coupling device when the battery terminal voltage exceeds the reference value. Disadvantages of the conventional battery charger includes: that the voltage fluctuation is substantial, that the power loss in the thyristors is substantial, that charging current cannot be conducted unless the generator is driven at relatively high speeds, and that there is a difficulty in cooling the thyristors. The reason for these disadvantages will be later described in detail, and it is just mentioned here that these disadvantages are mainly due to the facts that the gate currents flow through a path including the battery, that the cathodes of the thyristors are connected to each other and that the anode of the thyristors are at different potentials from each other.

SUMMARY OF THE INVENTION

An object of the present invention is to provide a battery charger wherein the voltage fluctuation is reduced.

Another object of the present invention is to provide a battery charger wherein power loss in the thyristors is reduced.

Another object of the present invention is to provide a battery charger which is capable of providing charging current to the battery even when the associated generator is driven at a relatively low speed.

Another object is to provide a battery charger in which cooling of the thyristors is facilitated.

A battery charger according to the present invention includes a hybrid bridge rectifier circuit to rectify the output of an AC generator to charge a battery. The rectifier circuit comprises a plurality of thyristors having the anodes connected to each other to form the negative output terminal of the rectifier circuit and a plurality of diodes having the cathodes connected to each other to form the positive output terminal of the rectifier circuit and having the anodes respectively connected to the cathodes of the thyristors. The junctions between the anodes of the diodes and the cathodes of the thyristors respectively forming the input terminals of the rectifier circuit, and a control circuit adapted to couple the gates of the thyristors to the positive output terminal of the rectifier circuit when the terminal voltage of the battery is below a reference value.

The rectifier circuit may further include a plurality of auxiliary diodes having the cathodes respectively connected to the gates of the thyristors and having the anodes connected to each other to form the control terminal of the rectifier circuit.

The control circuit may includes a transistor adapted to couple the control terminal of the rectifier circuit to the positive output terminal of the rectifier circuit when the battery terminal voltage is below the reference value.

The control circuit may alternatively includes a resistor adapted to couple the control terminal of the rectifier circuit and the positive output terminal of the rectifier circuit, and a transistor adapted to provide a bypass for preventing current flowing through the resistor from flowing into the gates of the thyristors.

Since the gate currents flow through a path which does not include the battery, the thyristors can be triggered even when the generator is driven at relatively low speeds and hence the generator's output voltage is relative small. Since the cathodes of the thyristors are connected to the input terminals of the rectifier circuit they are at different potentials, and when one of the thyristors in a condition wherein its cathode is negative relative to the positive output terminal of the rectifier circuit, the remaining thyristors are not in such a condition. As a result only that thyristor which is positively biased receives the gate current and is turned on to conduct charging current. The remaining thyristors, being negatively biased, do not receive gate current, so that reverse leakage currents which cause power loss do not flow. Also, effects of the difference between the gate sensitivities of the thyristors are eliminated, so that voltage fluctuation is reduced. Moreover, since the anodes of the thyristors are connected to each other, they can be connected to a common heat sink directly, i.e., without insertion of an insulator therebetween, so that cooling effect of the heat sink is improved.

BRIEF DESCRIPTION OF THE DRAWINGS

Other features and advantages of the present invention will be apparent from the following description of the preferred embodiments taken in conjunction with the accompanying drawing, in which.

DETAILED DESCRIPTION OF THE PREFERRED EMBODIMENTS

Figure 1:
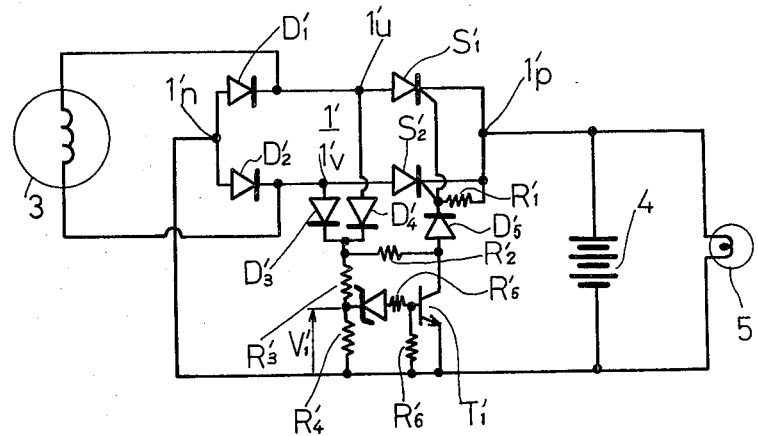
FIG. 1 shows a circuit diagram of a conventional battery charger illustrated to explain the features of the invention in contrast thereto.

Referring now more particularly to FIG. 1, there is shown an example of a conventional battery charger including a rectifier circuit 1' adapted to rectify the output of an AC generator 3 to charge a battery 4, across which a load such as a lamp 5 is connected. The rectifier circuit 1' comprises a pair of diodes $D_1'$, $D_2'$ having the anodes connected to each other to form the negative output terminal $1n'$ of the rectifier circuit $1'$ and a pair of thyristors $S_1'$, $S_2'$ having the cathodes connected to each other to form the positive output terminals $1p'$. The anodes of the thyristors $S_1'$, $S_2'$ are respectively connected to the cathodes of the diodes $D_1'$, $D_2'$ to form the input terminals $1u'$, $1v'$, respectively. The gates of the thyristors $S_1'$, $S_2'$ are both connected to an end of a resistor $R_1'$, the other end of which is connected to the positive output terminal $1p'$. The input terminals $1u'$, $1v'$ of the rectifier circuit $1'$ are respectively connected to the anodes of diodes $D_3'$, $D_4'$, whose cathodes are both connected through a resistor $R_2'$ to the anode of a diode $D_5'$. The cathode of the diode $D_5'$ is connected to the gates of the thyristors $S_1'$, $S_2'$. The anode of the diode $D_5'$ is connected to the collector $T_1'$, whose emitter is connected to the negative output terminal $1n'$ of the rectifier circuit. The cathodes of the diodes $D_3'$, $D_4'$ are also connected to an end of a resistor $R_3'$. The other end of the resistor $R_3'$ is connected to an end of a resistor $R_4'$, the other end of which is connected to the negative output terminal $1n'$. The junction between the resistors $R_3'$, $R_4'$ is connected to the cathode of a Zener diode $Z_1'$, whose anode is connected through a resistor $R_5'$ to the base of the transistor $T_1'$. A resistor $R_6'$ couples the base and the emitter of the transistor $T_1'$.

When the battery terminal voltage is below the reference value and hence the voltage $V_1'$ across the resistor $R_4'$ is below the Zener voltage of the Zener diode $Z_1'$, the transistor $T_1'$ is maintained nonconductive. Accordingly, gate signals are supplied through the diodes $D_3'$, $D_4'$, the resistor $R_2'$ and the diode $D_5'$ to the thyristors $S_1'$, $S_2'$, which are therefore turned on to conduct charging current to the battery. When the battery terminal voltage exceeds the reference value, and hence the voltage $V_1'$ exceeds the Zener voltage of the Zener diode $Z_1'$, the transistor $T_1'$ is rendered conductive, so that a current flowing through the resistor $R_2'$ is prevented from flowing into the gates of the thyristors $S_1'$, $S_2'$. Therefore, conduction of the thyristors $S_1'$, $S_2'$ and battery charging current are prevented.

The conventional battery charger of FIG. 1 has inherent disadvantages as noted below. First, the gates of the thyristors $S_1'$, $S_2'$ are coupled to each other to receive gate signals from common signal sources (input terminals of the rectifier circuit) and the cathodes of the thyristors $S_1'$, $S_2'$ are connected to each other. Therefore, if there is a difference between the gate sensitivities of the thyristors, more current flows into the thyristor having the higher gate sensitivity, and the thyristor having the higher gate sensitivity is easier to be turned on. With only one thyristor being turned on, the effect is similar to that obtained when only halfwave rectification is achieved. Only when the battery terminal voltage substantially falls, the two thyristors are alternatingly turned on. Accordingly, the battery terminal voltage fluctuates over a relatively wide range. Secondly, the gate signals are supplied not only to the thyristor which is being positively biased, but also to the thyristor which is being negatively biased, so that a reverse leakage current, i.e. a current flowing into the cathode and out of the anode, flows through the thyristor being negatively biased. Such reverse leakage current causes a power loss in the thyristor. Thirdly, it should be noted that the thyristors cannot be turned on unless the generator's output voltage is higher than the sum of the battery terminal voltage and the voltage drop across the resistor $R_2'$, because the gate current flows through a path including the battery and the resistor $R_2'$. On the other hand, the resistance of the resistor $R_2'$ cannot be too small to restrain the power loss in the resistor $R_2'$ and to reduce the capacity of the transistor $T_1'$. Because the resistance of the resistor $R_2'$ cannot be too small, the turn-on of the thyristors and hence the charging of the battery cannot be achieved unless and until the generator is driven at a substantially high speed. In the fourth place, since anodes of the thyristors are at different potentials, an insulator has to be inserted between the anodes (The anode is usually the outer casing of the thyristor unit) and a heat sink. Such insertion of an insulator reduces the cooling effect of the heat sink. This is more problematical with larger charging currents.

The present invention aims at eliminating the above mentioned disadvantages of the conventional battery charger.

Figure 2:
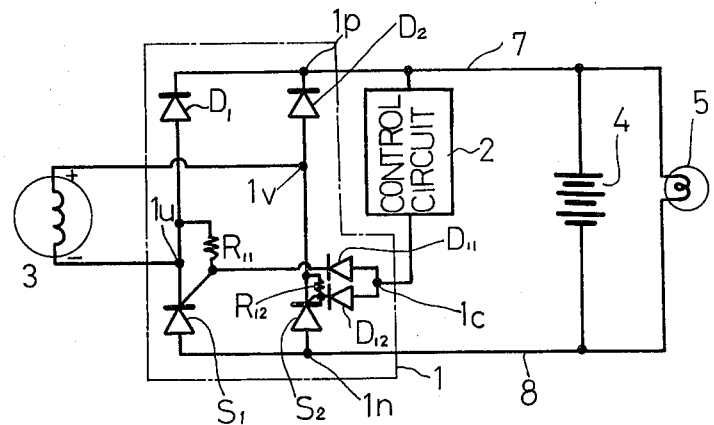
FIG. 2 shows a circuit diagram of the general construction of an embodiment of the invention.

FIG. 2 shows a general construction of an embodiment of a battery charger according to the invention. The battery charger includes a hybrid or semicontrolled bridge rectifier circuit 1 adapted rectify the output of an AC generator 3 to charge a battery 4, which itself is connected to energize a load such as an electric lamp 5. More particularly, the rectifier circuit 1 comprises a pair of thyristors $S_1$, $S_2$ having the anodes connected to each other to form the negative output terminal $1n$ of the rectifier circuit. The rectifier circuit 1 also comprises a pair of diodes $D_1$, $D_2$ having the cathodes connected to each other to form the positive output terminal $1p$ of the rectifier circuit 1. The anodes of the diodes $D_1$, $D_2$ are respectively connected to the cathodes of the thyristors $S_1$, $S_2$, and the junctions between the anodes of the diodes $D_1$, $D_2$ and the cathodes of the thyristors $S_1$, $S_2$ respectively form AC input terminals $1u$, $1v$ of the rectifier circuit 1. The input terminals $1u$, $1v$ are respectively connected to the generator's output terminals. The positive output terminal $1p$ of the rectifier circuit 1 is connected via a lead 7 to the positive terminal of the battery 4. The negative output terminal $1n$ of the rectifier circuit 1 is connected via a lead 8 to the negative terminal of the battery 4. The rectifier circuit 1 also comprises a pair of auxiliary diodes $D_{11}$, $D_{12}$ having the cathodes respectively connected to the gates of the thyristors $S_1$, $S_2$ and having the anodes connected to each other to form a control terminal $1c$ of the rectifier circuit 1. Resistors $R_{11}$, $R_{12}$ are respectively connected across the gates and the cathodes of the thyristors $S_1$, $S_2$.

The battery charger also comprises a control circuit 2 adapted to couple the control terminal $1c$ of the rectifier circuit 1 and hence the gates of the thyristors $S_1$, $S_2$ to the positive output terminal $1p$ of the rectifier circuit 1 when the battery terminal voltage is below a reference value.

Figure 3:
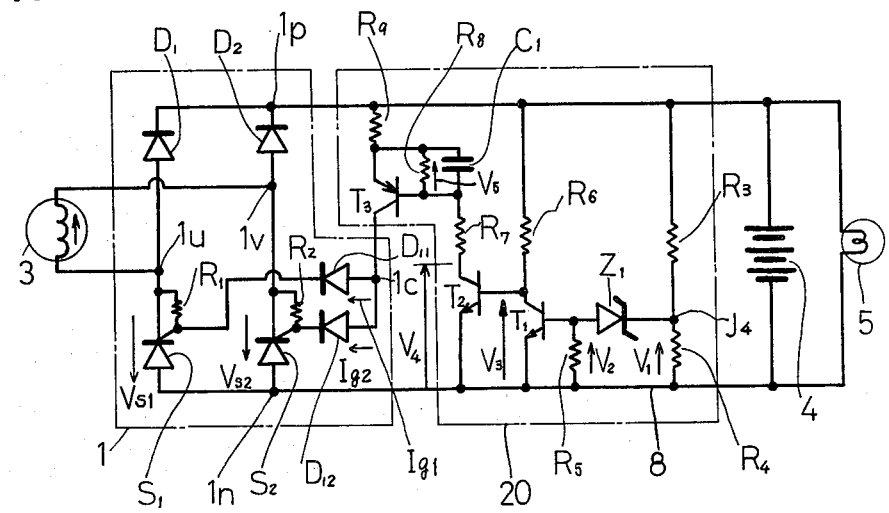
FIG. 3 shows a circuit diagram of a specific embodiment of the present invention.

In FIG. 3, specific example of a control circuit is shown, in conjunction with a rectifier circuit identical to the rectifier circuit of FIG. 2. As illustrated, the control circuit 20 comprises a resistor $R_3$ having one end connected to the lead 7 and having the other end connected to one end of a resistor $R_4$, the other end of which is connected to the lead 8. The series circuit of the resistors $R_3$, $R_4$ form a voltage divider detecting the battery terminal voltage, and the junction $J_4$ between the resistors $R_3$, $R_4$ forms the divided output terminal of the voltage divider. The divided output terminal $J_4$ is connected to the cathode of a Zener diode $Z_1$, whose anode is connected to the base of a first transistor $T_1$ of an NPN type. The emitter of the first transistor $T_1$ is connected to the lead 8. A resistor $R_5$ is connected across the base and the emitter of the transistor $T_1$. A resistor $R_6$ couples the collector of the transistor $T_1$ to the lead 7. The collector of the transistor $T_1$ is also connected to the base of a second transistor $T_2$ of an NPN type, whose emitter is connected to the lead 8. The collector of the transistor $T_2$ is connected to an end of a resistor $R_7$, the other end of which is connected to the base of a third transistor $T_3$ of a PNP type. The emitter of the transistor $T_3$ is coupled to the lead 7 by a resistor $R_9$. Connected across the base and the emitter of the transistor $T_3$ are a resistor $R_8$ and also a capacitor $C_1$. The collector of the transistor $T_3$ is connected to the control terminal of the rectifier circuit 1.

Figure 4:
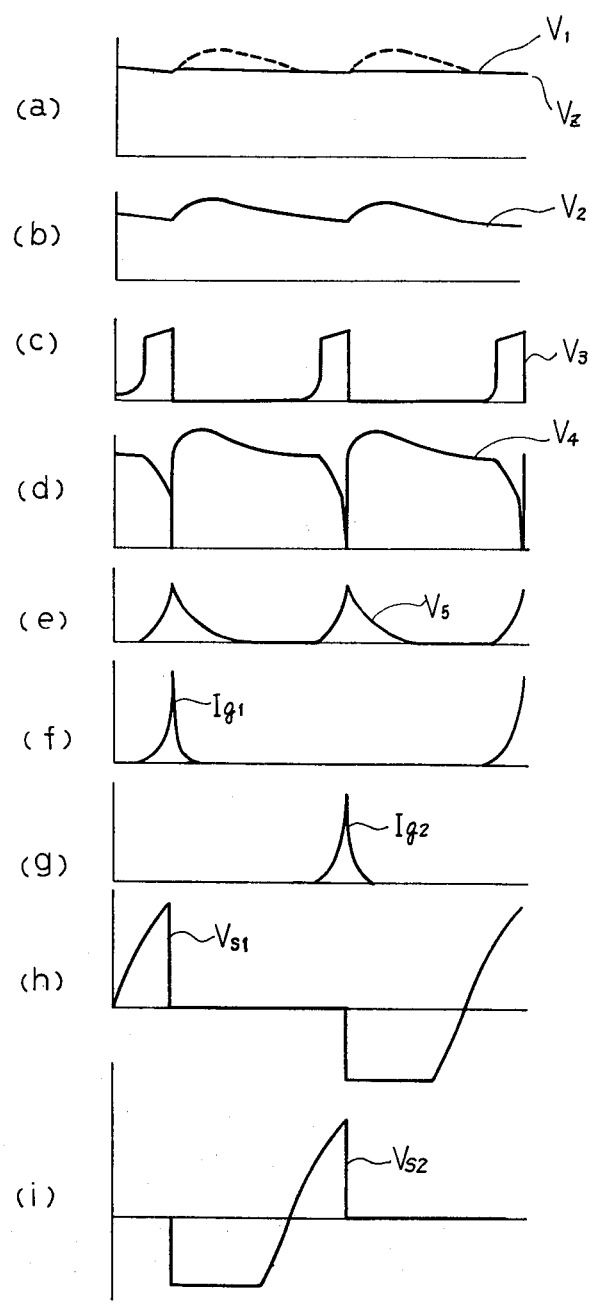
FIGS. 4(a) through (i) show the waveforms of voltages and currents at various portions of the embodiment of FIG. 3.

FIGS. 4(a) through 4(i) show the waveforms of voltages and currents which appear at various portions of the circuit of FIG. 3 when the battery terminal voltage is below a reference value. More particularly, FIG. 4(a) shows the voltage $V_1$ across the resistor $R_4$. FIG. 4(b) shows the voltage $V_2$ across the resistor $R_5$. FIG. 4(c) shows the voltage $V_3$ across the collector and the emitter of the transistor $T_1$. FIG. 4(d) shows the voltage $V_4$ across the collector and the emitter of the transistor $T_2$. FIG. 4(e) shows the voltage $V_5$ across the resistor $R_8$. FIG. 4(f) shows the gate current $I_{g1}$ of the thyristor $S_1$. FIG. 4(g) shows the gate current $I_{g2}$ of the thyristor $S_2$. FIG. 4(h) shows the voltage $V_{s1}$ across the anode and the cathode of the thyristor $S_1$. FIG. 4(i) shows the voltage $V_{s2}$ across the anode and the cathode of the thyristor $S_2$. When the battery terminal voltage is below a reference value, each half cycle of the generator's output has a period in which the voltage $V_1$ across the resistor $R_4$ is below the Zener voltage $V_z$ of the Zener diode $Z_1$ as shown in FIG. 4(a), so that no base current is supplied to the transistor $T_1$, which is therefore kept nonconductive. With the transistor $T_1$ being nonconductive, the transistor $T_2$ is rendered conductive because of the current flowing through the resistor $R_6$. And with the transistor $T_2$ being in conductive state, a current flows through the resistors $R_9$, $R_8$, $R_7$, and through the collector and the emitter of the transistor $T_2$. Because of the voltage drop across the resistor $R_8$, the base of the transistor $T_3$ is rendered negative relative to the emitter of the transistor $T_3$, so that the transistor $T_3$ is in conductive state. Accordingly, as any one of the rectifier's input terminals 1u, 1v is rendered negative relative to the positive output terminal 1p, a current is supplied from the positive output terminal 1p through the resistor $R_9$, the conducting transistor $T_3$ and either of the diodes $D_{11}$, $D_{12}$ to the gate of either of the thyristors $S_1$, $S_2$ whose cathode is being rendered negative. For instance, when the generator 3 produces an output of a polarity indicated by the arrow and the rectifier's input terminal 1u is rendered negative relative to the positive output terminal 1p, a current is supplied from the positive output terminal 1p, through the resistor $R_9$, the transistor $T_3$ and the diode $D_{11}$, to the gate of the thyristor $S_1$. At this moment, the thyristor $S_1$ is positively biased, that is, the anode of the thyristor $S_1$ is positive relative to the cathode of the thyristor $S_1$. On the other hand, the thyristor $S_2$ is negatively biased, and does not receive a gate current since its cathode is not positive relative to its cathode. Accordingly, only the thyristor $S_1$ is turned on to conduct a current to charge the battery 4. Similarly, while the generator 3 produces an output of the opposite polarity, only the thyristor $S_2$ receives a gate current and is turned on. It is thereby ensured that the two thyristors alternatingly conduct as long as the transistor $T_3$ is conductive, and the two thyristors are thus evenly utilized even if there is a difference between the gate sensitivities of the two thyristors. And accordingly, voltage fluctuation is reduced because such a situation avoided wherein only one of the thyristors having the higher gate sensitivity is turned on.

Moreover, each of the thyristors does not receive a gate current when it is being negatively biased, so that reverse leakage current is prevented and power loss due to reverse leakage current is eliminated.

Furthermore, since the gate current flows through a path which does not include the battery 4, the gate current is supplied whenever the generator's output voltage even slightly exceeds the battery terminal voltage, so that charging of the battery is effected even when the rotational speed of the generator (on which the generator's output voltage is dependent) is relatively low.

When either thyristor is positively biased (because the generator's output voltage exceeds the battery terminal voltage) the magnitude of the gate current is substantially equal to the battery terminal voltage divided by the resistance of the resistor $R_9$. Accordingly, the resistance of the resistor $R_9$ may be increased as far as a sufficient gate current flows. As a result, the power loss in the resistor $R_9$ can be minimized, and also the capacity of the transistor $T_3$ can be reduced because the current flowing through the transistor $T_3$ is relatively small.

The gate current is terminated as the voltage across the resistor $R_4$ exceeds the Zener voltage $V_z$. Thus, it flows for only a short duration as shown in FIG. 4(f). As a result, the effective value of the current and hence the power loss in the resistor $R_9$ is small.

As the battery terminal voltage exceeds the reference value, and hence the voltage $V_1$ exceeds the Zener voltage $V_z$ from the beginning to the end of each half cycle, a current flows from the positive terminal of the battery 4 through the resistor $R_3$, through the Zener diode $Z_1$ to the base of the transistor $T_1$, which is therefore rendered conductive. With the transistor being conductive, the transistor $T_2$ is kept nonconductive. With the transistor $T_2$ being nonconductive, no current flows through the resistor $R_8$, and hence the transistor $T_3$ is kept nonconductive. Accordingly, no gate current is supplied to the thyristors, which are therefore kept nonconductive. Thus, charging of the battery 4 is prevented.

The above described operation is repeated to regulate the battery terminal voltage.

Since the anodes of the thyristors $S_1$, $S_2$ are connected together, they can be connected directly to a common casing of the battery charger acting as a heat sink, and, as a result, cooling of the thyristors is efficiently achieved.

The capacitor $C_1$ serves to absorb any voltage surges, particularly those induced when the charging current is terminated at the end of each half cycle, thereby preventing erroneous conduction of the transistor $T_3$.

In the particular embodiment described above, if the battery 4 is accidentally, or for some other reason, disconnected from the leads 7, 8, the base current to the transistor $T_2$ is not supplied and hence the transistors $T_2$, $T_3$ are kept nonconductive, so that conduction of the thyristors is prevented. Accordingly, the lamp 5 is protected from overvoltage which may occur in a prior art battery charger when the battery is disconnected.

Figure 5:
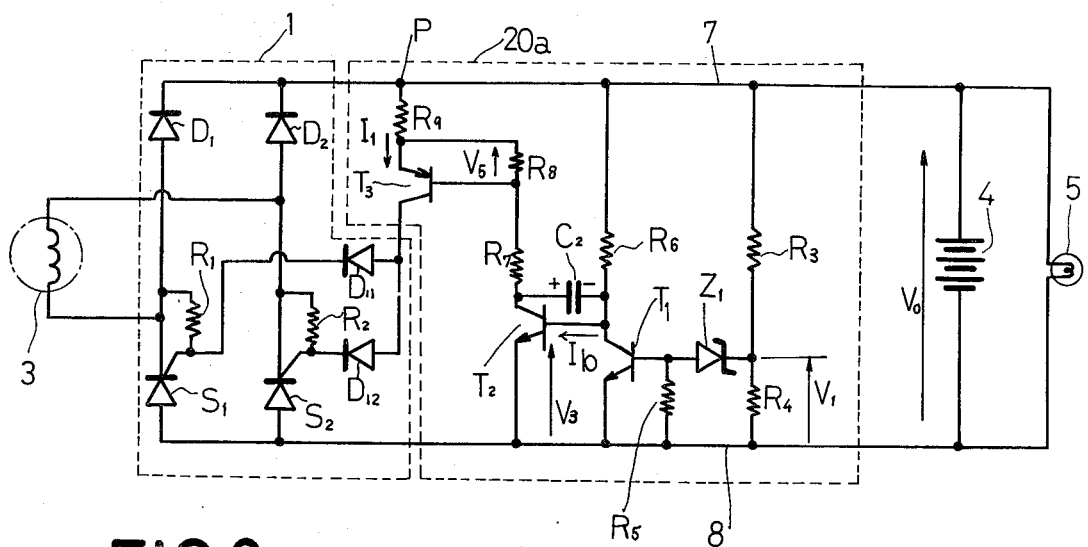
FIG. 5 shows a circuit diagram of another embodiment of the invention.

FIG. 5 shows another embodiment of the invention. The rectifier circuit 1 has a similar construction to that of FIG. 3. The construction of the control circuit 20a of this embodiment is also similar to the construction of the control circuit 20 of the embodiment of FIG. 3, except that the capacitor $C_1$ of FIG. 3 is omitted and a capacitor $C_2$ is connected across the base and the collector of the transistor $T_2$. The voltage detecting circuit comprises a Zener diode $Z_1$, and the series circuit of the resistor R3 and R4. The capacitor $C_2$ is provided for the following reason. It is observed that the battery terminal voltage Vo falls below the reference voltage Es by an amount of voltage Eo (which is in the order of 0.1 to 0.2 V) almost at the end of the charging current during each half cycle. The period during which the battery terminal voltage Vo is below the reference value Es last for about tens of microseconds. During such period, the transistor $T_1$ is rendered nonconductive, and as a result the transistor $T_3$ is rendered conductive, so that the undesirable signals are supplied to the gate of the thyristor $S_1$ or $S_2$, which is therefore rendered conductive. Such erroneous operation is more likely to occur when the temperatures of the thyristors rise and the gate sensitivities of the thyristors become higher. When the thyristors are turned on the temperatures thereof rise further, so that they become even easier to be turned on. Therefore, the battery terminal voltage cannot be properly regulated.

Figure 6:
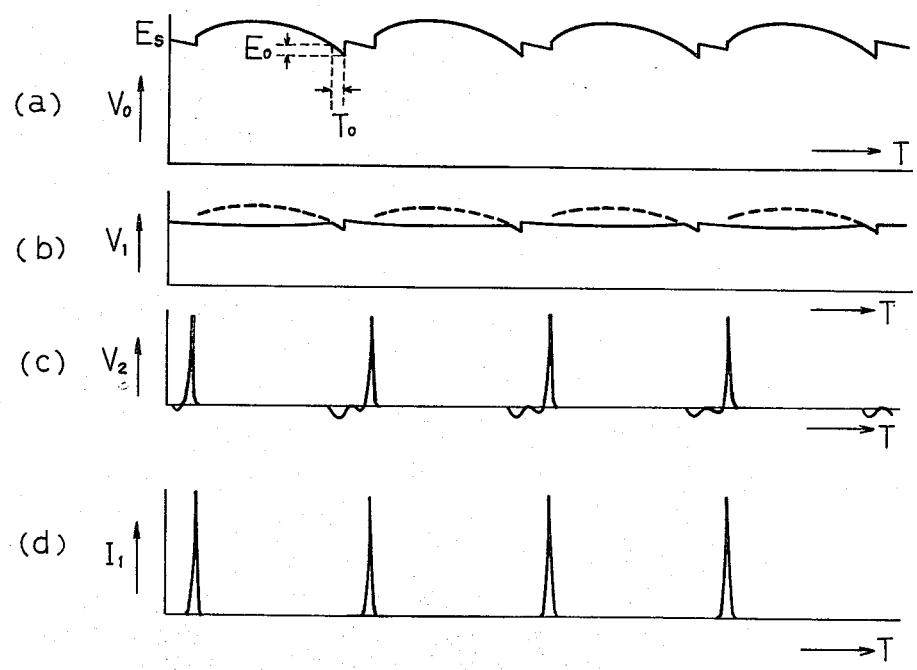
FIGS. 6(a) through (d) show the waveforms of voltages and a current at various portions of the embodiment of FIG. 5.

With the capacitor $C_2$ being provided, the operation of the circuit is as follows: While the battery terminal voltage Vo (FIG. 6(a)) is above the reference voltage Es, and hence the voltage $V_1$ (FIG. 6(b)) exceeds the Zener voltage, the transistor $T_1$ is rendered conductive, and hence the transistor $T_2$ is nonconductive, so that the capacitor $C_2$ is charged to a voltage substantially equal to the peak value Vom of the voltage Vo. As the battery terminal voltage falls below the reference voltage at the end of the charging current, the transistor $T_1$ is rendered nonconductive. The voltage $V_3$ across the collector and the emitter of the transistor $T_1$ rises as shown in FIG. 6(c) and reaches the threshold voltage Vt across the base and the emitter of the transistor $T_2$. The resultant conduction of the transistor $T_2$ causes the potential at the collector thereof to be the sum of the threshold voltage Vt and the voltage on the capacitor which is substantially equal to the voltage Vom. On the other hand, the potential on the lead 7 is at Vo which is lower than Vom, and of course lower than the sum of Vom and Vt. The potential difference causes a discharging current flowing out of the capacitor $C_2$ and through the resistors $R_7$, $R_8$, $R_9$, and the voltage drop across the resistor $R_8$ due to the discharging current renders the base of the transistor $T_3$ positive relative to the emitter of the transistor $T_3$. The transistor $T_3$ is kept nonconductive while the discharging current flows. The period for which the discharging current continues to flow is dependent on the capacitance of the capacitor $C_2$ and the resistances of the resistors forming the discharging current path. Accordingly, the transistor $T_3$ can be prevented from conduction throughout the period To (FIG. 6(a)) by having the above mentioned capacitance and resistances appropriately determined.

By the use of the capacitor $C_2$, it is ensured that thyristors are not turned on when the battery terminal voltage falls below the reference value at the end of the charging current flowing period. It will be understood that the capacitor $C_1$ serving to absorb voltage surges may be incorporated in the embodiment of FIG. 5.

Figure 7:
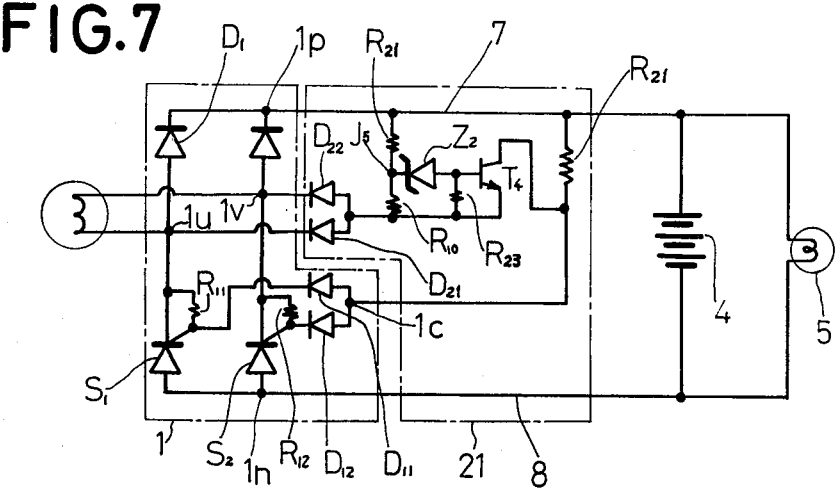
FIGS. 7 through 9 respectively show circuit diagrams of other embodiments of the invention.

FIG. 7 shows another embodiment of the present invention. The battery charger of this embodiment includes a rectifier circuit 1 similar to that of FIG. 3 and a control circuit 21. The control circuit 21 includes a pair of diodes $D_{21}$, $D_{22}$ having the cathodes respectively connected to the input terminals 1u, 1v of the rectifier circuit 1. The anodes of the diodes $D_{21}$, $D_{22}$ are connected to each other and are connected to an end of a resistor $R_{10}$, the other end of which is connected to an end of a resistor $R_{21}$. The other end of the resistor $R_{21}$ is connected to the lead 7. The series circuit of the resistors $R_{10}$, $R_{21}$ forms a voltage divider detecting the voltage across the positive output terminal 1p and the input terminals 1u, 1v.

The junction $J_5$ between the resistors $R_{10}$, $R_1$ is connected to the cathode of a Zener diode $Z_2$, whose anode is connected to the base of a transistor $T_4$. The emitter of the transistor $T_4$ is connected to the anodes of the diodes $D_{21}$, $D_{22}$ and a resistor $R_{23}$ couples the base and the emitter of the transistor $T_4$. The control terminal 1c of the rectifier circuit 1 is coupled through a resistor $R_{12}$ to the lead 7 and is also connected to the collector of the transistor $T_4$.

The resistor $R_{22}$ couples the control terminal 1c of the rectifier circuit 1 to the positive output terminal 1p, and when the input terminal 1u or 1v is rendered negative relative to the positive output terminal 1p a gate signal is supplied to the thyristor $S_1$ or $S_2$. However, when the transistor $T_4$ is conductive, it effectively bypass the current flowing through the resistor $R_{22}$ to prevent conduction of the thyristors.

When the battery terminal voltage is below the reference value and hence the voltage across the resistor $R_{10}$ is below the Zener voltage of the Zener diode $Z_2$, the transistor $T_4$ is nonconductive, so that the thyristors can be turned on and the charging of the battery is conducted. When the battery terminal voltage exceeds the reference value and hence the voltage across the resistor $R_{10}$ exceeds the Zener voltage of the Zener diode $Z_2$, then the transistor $T_4$ is conductive, thereby preventing turn-on of the thyristors and charging of the battery.

Figure 8:
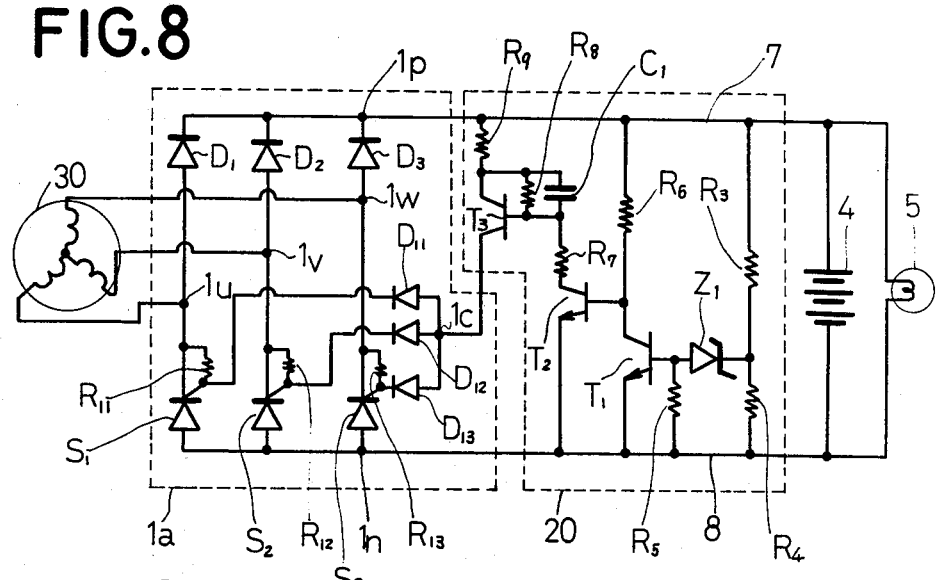

FIG. 8 shows another embodiment of a battery charger according to the invention adapted for use with a three phase generator 30. The battery charger of this embodiment includes a three phase hybrid bridge 1a comprising three thyristors $S_1$ and $S_3$ having the anodes connected to each other to form the negative output terminal 1n of the rectifier circuit 1a and three diodes $D_1$ through $D_3$ having the cathodes connected to each other to form the positive output terminal 1p of the rectifier circuit 1. The cathodes of the thyristors $S_1$ through $S_3$ are respectively connected to the anodes of the diodes $D_1$ through $D_3$ to form input terminal 1u, 1v, 1w, respectively. These input terminals 1u, 1v, 1w are connected to the output terminals of the generator 30. Resistors $R_{11}$ through $R_{13}$ are respectively connected across the gate and the cathode of the thyristors $S_1$ through $S_3$. The gates of the thyristors $S_1$ through $S_3$ are respectively connected to the cathodes of diodes $D_{11}$ through $D_{13}$, whose anodes are connected to each other to form the control terminal 1c of the rectifier circuit 1a. The control terminal 1c of the rectifier circuit 1a is coupled to the lead 7 by a control circuit 2 which has a similar construction to that of the embodiment of FIG. 3. The operation of the battery charger of this embodiment is substantially similar to that of the embodiment of FIG. 4.

Figure 9:
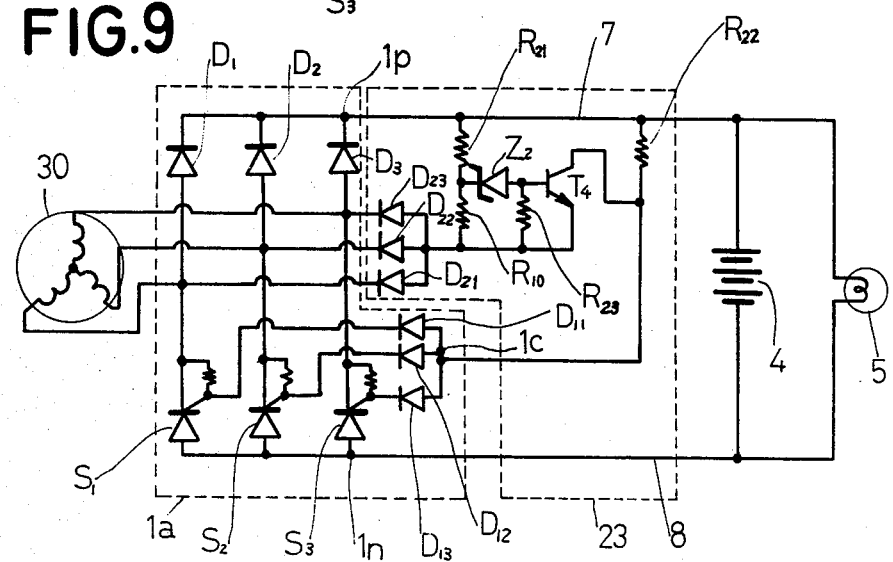

FIG. 9 shows still another embodiment of the invention adapted for use with a three phase generator. The battery charger of this embodiment includes a rectifier circuit $1a$ similar to that of FIG. 8, and a control circuit 23 substantially similar the control circuit 21 of FIG. 7, except that three diodes $D_{21}$ through $D_{23}$ are provided and have their cathodes respectively connected to the input terminals $1u$, $1v$, $1w$ of the rectifier circuit $1a$. The operation of the battery charger of this embodiment is substantially similar to that of the embodiment of FIG. 7.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A battery charger including a hybrid bridge rectifier circuit to rectify the output of an AC generator to charge a battery,
   wherein said rectifier circuit comprises:
   a plurality of thyristors having the anodes connected to each other to form the negative output terminal of the rectifier circuit,
   a plurality of diodes having the cathodes connected to each other to form the positive output terminal of the rectifier circuit and having the anodes respectively connected to the cathodes of the thyristors, the junctions between the anodes of the diodes and the cathodes of the thyristors respectively forming the input terminals of the rectifier circuit, and
   a plurality of auxiliary diodes having the cathodes respectively connected to the gates of said thyristors and having the anodes connected to each other to form a control terminal of the rectifier circuit, and
   further comprising a control circuit including,
   a voltage detecting circuit which detects the battery terminal voltage and produces an output signal when the battery terminal voltage exceeds a reference value,
   a first transistor having a base connected to the output terminal of said voltage detecting circuit and a collector coupled to said rectifier circuit so as to be conductive when said battery terminal voltage exceeds the reference value,
   a second transistor having an emitter connected to the negative terminal of said rectifier circuit and a base coupled to said first transistor so that base current of the second transistor is supplied from said rectifier circuit when said first transistor is nonconductive,
   a third transistor having a base coupled to the collector of said second transistor, an emitter coupled to the positive output terminal of said rectifier circuit and a collector coupled to said control terminal of said rectifier,
   said second transistor and third transistor being conductive when said first transistor is nonconductive,
   resistor means connected across the base and emitter of said third transistor, and
   capacitor means connected across the base and collector of said second transistor, said capacitor means being charged when said first transistor is nonconductive and said second transistor is conductive,
   the discharging current through said resistor means being in such a direction as to render the base of said third transistor positive relative to the emitter of said third transistor, thereby preventing conduction of said third transistor while said discharging current is flowing.

* * * * *